(12) United States Patent
Rastegar

(10) Patent No.: US 11,731,671 B2
(45) Date of Patent: Aug. 22, 2023

(54) METHODS AND MEANS TO DECELERATE TRAINS AND TRANSFORM ITS KINETIC ENERGY TO ELECTRICAL ENERGY

(71) Applicant: Omnitek Partners LLC, Ronkonkoma, NY (US)

(72) Inventor: Jahangir S Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 412 days.

(21) Appl. No.: 16/858,528

(22) Filed: Apr. 24, 2020

(65) Prior Publication Data

US 2020/0339165 A1 Oct. 29, 2020

Related U.S. Application Data

(60) Provisional application No. 62/840,313, filed on Apr. 29, 2019.

(51) Int. Cl.
*B61H 9/06* (2006.01)
*B61H 7/10* (2006.01)

(52) U.S. Cl.
CPC .............. *B61H 9/06* (2013.01); *B61H 7/10* (2013.01)

(58) Field of Classification Search
CPC .......... B61K 7/00; B61H 9/06; B61H 13/005; B61H 7/00–12; B64F 1/025; E01C 9/007
USPC ............ 318/375; 188/41, 28, 371; 104/26.2, 104/249; 404/11, 71, 6, 15
See application file for complete search history.

(56) References Cited

U.S. PATENT DOCUMENTS

| | | | | |
|---|---|---|---|---|
| 6,362,534 | B1 * | 3/2002 | Kaufman | F03G 7/08 290/1 R |
| 6,796,620 | B1 * | 9/2004 | Su | B60T 1/10 188/63 |
| 2006/0260883 | A1 * | 11/2006 | Heyden | B61K 7/04 188/62 |
| 2009/0309370 | A1 * | 12/2009 | Brand | F03G 7/08 290/1 R |
| 2013/0068124 | A1 * | 3/2013 | Kickbush | B61K 7/08 104/26.2 |

(Continued)

FOREIGN PATENT DOCUMENTS

DE 102006018892 B3 * 12/2007 ............... F03G 7/08

OTHER PUBLICATIONS

English machined translation of description of DE-102006018892-B3, Dec. 2007.*

*Primary Examiner* — Nicholas J Lane
*Assistant Examiner* — San M Aung

(57) ABSTRACT

A device for decelerating a vehicle traveling on one or more rails, the device including: energy absorbing units disposed along a direction of travel of the vehicle, the energy absorbing units each having a first surface for engagement with a second surface disposed on the vehicle such that the energy absorbing units are compressed when the second surface travels past and engages with the first surface of the energy absorbing units; wherein the absorbing units, when compressed, are configured to convert a kinetic energy of the vehicle to one or more of potential, heat and electrical energy; and the energy absorbing units are opposed to each other in a lateral direction relative to a direction of travel of the vehicle such that forces acting on the second surface from the energy absorbing units cancel in the lateral direction.

18 Claims, 10 Drawing Sheets

(56) References Cited

U.S. PATENT DOCUMENTS

2015/0258972 A1\* 9/2015 Majeskie ............... B61H 13/00
 303/10
2016/0061193 A1\* 3/2016 Horianopoulos ......... B60T 3/00
 238/1

\* cited by examiner

METHODS AND MEANS TO DECELERATE TRAINS AND TRANSFORM ITS KINETIC ENERGY TO ELECTRICAL ENERGY

CROSS-REFERENCE TO RELATED APPLICATION

This application claims the benefit of Provisional Application 62/840,313, filed on Apr. 29, 2019, the entire contents of which is incorporated herein by reference.

BACKGROUND OF THE INVENTION

1. Field of the Invention

The present invention relates generally to moving trains and methods and related means for decelerating a moving train without the use of currently used braking systems, and more particularly, to methods and related means of bringing a train to a stop at a station and that the train kinetic energy may be at least partially be transformed into electrical energy.

2. Prior Art

To slow down a moving train, a braking system would engage braking pads with the train wheels and the resulting friction forces between the braking pads and the wheels and if the braking forces are high enough to overcome the friction forces between the wheels and the rails would begin to slow down (decelerate) the train by dissipating its kinetic energy to mostly heat and wear between the brake pads and the wheels and the wheels and the rails. If the braking forces are high enough to lock the wheels, i.e., prevent the wheels from rotating, then the friction forces between the wheels and the rails alone would cause the train to be decelerated.

The braking pads are pressed against the wheels or other rotary surfaces such as discs, if the wheels are not locked or during the process of locking the wheels, the friction forces cause braking pads as well as wheels or other contacting surfaces upon which they act to wear. The friction forces between the wheels and the rails due to their relative sliding motion, when the braking forces are high enough to overcome the friction forces between the wheels and the rails and ultimately when the wheels are locked by the braking pads, would cause wear of the rails as well as the contacting surfaces of the wheels.

All trains must use their braking system at certain times during their travel to slow down (decelerate) and to come to a complete stop at certain locations such as their intended stations. Commuter trains and particularly city subway trains make stops at their stations every few minutes after travelling relatively short distances in between. This frequent stopping actions cause significant wear on the wheels and the braking pads and their contacting surfaces, and the rails in and close to the stations where the braking systems are activated to begin to decelerate the train to bring it to a stop in the station. The process of repairing worn out braking systems and replacing rails, particularly in subway systems that operate throughout the day, is very costly and is highly desirable to be minimized.

A need therefore exits for methods and means of decelerating trains, particularly as it is brought to a stop in an intended station, which results in minimal wear of the train braking system as well as the rail. Such a train decelerating system will significantly reduce the maintenance and service cost of the trains as well as the railing system in general, particularly for public transportation rail systems such as commuter trains and subway systems in which the trains make stops very frequently at relatively close stations.

It is highly desirable that the decelerating means be modular, readily mounted on to the train and the rail side, require minimal time to mount and replace and service and maintain to provide a low-cost solution and minimize the cost of train braking system service and wheel and rail service and replacement.

It is also highly desirable that at least part of the kinetic energy of the train that is absorbed by the provided decelerating system be converted to electrical energy rather than being wasted essentially as heat.

To stop runaway trains, the current practice is to provide a barrier at the end of the train tracks, which is achieved by providing fixed stops at the end of railway lines. The stops may be provided with certain spring and/or damping element to absorb some of the shock. A pile of soil may also be provided behind the stop structure to further absorb the kinetic energy of the train. However, such stops cannot gradually slow the train to a stop and cannot prevent serious injury to the occupants and property. In addition, since such systems can only be installed at the railway end. Thus, the system cannot be used to slow down and bring to a stop runaway trains at any other location along the railway.

Another method and apparatus for slowing down and brining to a stop runaway trains are disclosed in the U.S. Pat. No. 7,717,043, the contents of which are incorporated herein by reference. In this prior art apparatus for decelerating trains, elastic elements that are built into the railway segment are depressed by the weight of the train as the train moves over the decelerating section of the railway. The elastic elements are then locked in their depressed position, thereby locking the potential energy that is passed by the train to the elastic elements. In parallel and/or in series with said elastic elements, viscous damping and/or dry friction type of damping elements may also be provided to convert part of the kinetic energy of the train into heat. As a result, the moving train is decelerated and can be brought to a stop. One embodiment of this prior art apparatus for decelerating a train is shown in FIG. 1.

In the side view of FIG. 1, a train 350 with wheels 351 is shown traveling over a rail 352, laid over the ground 353 via rail ties (not shown). The train is moving in the direction of the arrow 358. A rail panel 102 of the top section of the rail is attached to the rail via the hinge 355. The rail panel 102 is biased upwards by the support and control element(s) 109, which includes the elastic element(s), and can also include viscous and/or dry friction type damping element(s). As the wheel 351 rolls over the section 354, the weight carried by the wheel depresses the rail panel 102 down into place by rotating it in the direction of the arrow 357 flush with the other segments of the rail 352. A locking mechanism 359 will then lock the panel 102 in place, "locking" the imparted potential energy in the elastic elements of the support and control element(s) 109. As a result, the kinetic energy of the train 350 is transferred partly as potential energy to the elastic elements of the support and control element(s) 109 and partly transformed into heat by the viscous and/or dry friction type damping element(s) of 109. As a result, the train is decelerated while traveling over the section of the rail containing the rail panels 102. By providing a plurality of such rail panels and associated support and control element(s) 109 and locking mechanisms 359 along a segment of the railway, the runaway train can be decelerated and brought to a stop. The rail panels 102 are released after each wheel passes for engagement with the next passing wheel to maximize train deceleration.

In another above prior art embodiment shown in FIG. 2, a panel 102a not associated with the rail is used instead of the rail panel 102 in FIG. 1. The panel 102a is attached to a surface of the railway with the hinge 366, either between the rails as shown in FIG. 2 or beyond the rails. The support and control element(s) 109 is similarly positioned to bias the panel 102a upward. In the schematic of FIG. 2, the train 350 is shown to be positioned on the rails 352 by the wheels 351. The wheels 351 are attached to the train chassis by the axle 362. The rails are in turn supported on the railway supports shown as ground 353. Cylindrical elements 368 are also affixed to the axle 362 or directly to the wheels 351. As the wheels travel over the panels 102a, the panels are depressed by the surface of the cylinders 368, thereby as was described for the embodiment of FIG. 1 would result in the train being decelerated. By providing enough such decelerating elements along the railway along both rails, the train is decelerated and can be brought to a stop. Alternatively, the panels 102a are positioned under the body of the train as indicated by the panel 102b in FIG. 2, which is attached to a surface of the railway with the hinge 372. A support and control element(s) 109 is provided to keep the panels 102b biased up. As the train travels over the section of the railway containing the panels, the relatively rigid structure 371 which is rigidly attached to the bottom surface of the train chassis depresses the panels 102b, thereby causing the train to be decelerated as previously described.

The rail panels 102, 102a, 102b, after locking may be released such that the train's subsequent wheels (in a direction opposite to the direction of travel) can also act upon the rail panel 102, 102a, 102b to maximize the deceleration of the apparatus. Apparatus and method for releasing the panel 102, 102a, 102b after it is locked are disclosed in the U.S. Pat. No. 7,530,760 entitled "A Roadway for Decelerating a Vehicle Including a Delayed Release Means for Depressed Runway Panels", the contents of which are incorporated herein by reference.

The support and control elements 109 can be equipped with actuation mechanisms such that the panels 102, 102a, 102b could be deployed only when they are needed to decelerate a runaway train or help slow down a train. This can be accomplished by providing an actuator to release the locking mechanisms of the support and control elements 109. Alternatively, the support and control elements 109 can be equipped with pneumatic springs that could also be used to deploy the panels 102, 102a, 102b. With regards to panel 102, if the top surface of the panel 102 were flush with the top surface of the rail 352 when the panels 102 is kept closed, the rail would operate as a regular rail without operation of the panels 102. The panels 102 can be deployed when needed by such actuation mechanisms, such as at a train station to assist the train's braking system in stopping the train at the station while other trains not stopping at the station can pass over the closed panels.

The above prior art embodiments, however, are permanently installed at fixed locations cannot therefore be deployed as needed along a section of the runway.

In addition, the prior art embodiments of FIG. 1 and FIG. 2 use their weight to transfer the train's kinetic energy into potential energy of the system elastic elements for storage while the wheel passes over the actuating panels 102, 102a and 102b. As a result, the panels apply an opposite force to the affected wheels in the direction of lifting the train. If the spring rate is set to be high enough to stop the train in a relatively short distance, then the train may experience a certain level of up and down motion, depending on the spring rate level.

The train slowing down system design can operate without causing an up and down motion of the train during relatively rapid stops, which could affect the performance of the train braking system (if applied) and that could discomfort and alarm the passengers.

In addition, the prior art embodiments suffer from a number of shortcomings for use for deployment as needed along a segment of a railway and also for installment in railway and subway stations where the train makes routine and/or frequent stops to minimize wheel, brake and rail wear to minimize maintenance and service costs, as well as to minimize the presence of metal and other particle concentration around the stops that pose health hazard to passengers and railway workers, particularly in underground subway stations, as well as minimize the clogging and shorting of electrical switch gear, etc., that cause train operation stoppage and delays and related operational and repair costs.

A need therefore exists for methods to develop and related apparatus that can be deployed at railway sections over which a runaway train can be slowed down to a stop or a train exceeding the safe speed can be slowed down to a safe speed level. The developed apparatus can be capable of being configured to be portable for transport to the desired railway section location, modular and rapidly deployable (installed) at the desired railway section. The apparatus can also be able to be readily adjusted to the size and speed of the train and the distance within which the train must be brought to a stop.

The apparatus can be capable of being equipped with sensory, actuation and control means to make it adaptable and capable of fully automatic operation or operation that requires minimal human interaction.

SUMMARY OF THE INVENTION

Accordingly, methods for slowing trains and bringing them to a stop or slowing trains to a prescribed speed level when it is traveling above the prescribed speed level are provided. The disclosed apparatus developed based on these methods can be portable for transport to the desired railway section location, modular, rapidly deployable (installed) at the desired railway section and can be capable of being equipped for fully automatic or partially automatic operation.

Hereinafter, the train decelerating systems that do not rely on brake pad friction and friction between the wheel and the rail to absorb the kinetic energy of a moving train are referred to as "Train Decelerating Systems" (TDS) without intending to limit their applications to trains, and that by train, it is also intended to include railroad cars.

An objective is to provide highly modular and easy to install, replace and maintain and TDS that can be used safely to slow down (decelerate) trains in general and bring trains to a stop at designated stations with and/or without assistance from (friction based and/or regenerating) braking systems. To this end, the disclosed TDS have one or more of the following characteristics:

1. The TDS design is modular allowing for ease of installment on the train and the rail section.
2. The TDS consists of modular sections that can be installed and replaced quickly, thereby minimizing installation and maintenance and service time to achieve minimal traffic interruption.

3. The TDS minimize rail, wheel and braking system wear due to train deceleration to slow down and bring the train to stop at stations.

4. The TDS may be constructed as modular segments that are readily and rapidly installed and removed as needed to accommodate trains with various lengths and carrying weight.

5. The TDS components mounted on the rail may be passive or active to accommodate the deceleration requirements for each train using train speed and deceleration rate and position information for feedback control action.

6. The TDS components mounted on the train may be passive or active to accommodate the deceleration requirements for each train using train speed and deceleration rate and position information for feedback control action.

7. The TDS and the train braking system may be used together for decelerating the train to a stop at the desired location in a station or the like.

8. The TDS may also be used for decelerating and stopping run-away trains by providing the rail mounted mechanism of the TDS at strategic locations and near the end of the rail lines.

9. The TDS mechanism and its components mounted on the rail may be constructed at portable modules that can be mounted quickly onto the rail at any location along the railways for decelerating a run-away train and bringing it to a stop or for ensuring that a train that is running at higher than safe speeds is decelerated to a safe speed.

10. The train conductor (or its self-driving automated system—when present) and/or an operator on the ground on the rail side (or an automated system performing the same tasks) can set and control the parameters of the TDS to optimally decelerate the train and to bring it to a stop at the desired location.

11. The rail mechanism component of the TDS may be equipped with any one of the available means of determining the speed of the train before engaging the mechanism and other available parameters—for example those that are provided by the train, such as the weight, length, etc.—for optimally setting the parameters of the TDS automatically or by an operator (which may be the train conductor).

12. The rail and train mechanism components of the TDS may be equipped with the communications equipment necessary to receive the information indicated in the previous item directly from the train for use for optimally setting the parameters of the TDS automatically or by an operator (which may be the train conductor). The TDS controller may combine the information received from the train with information collected at the rail side to check for any discrepancy or added information and base its decision for optimal setting of the TDS parameters on the total collected data for maximum reliability and effectiveness.

13. The TDS provides a safe process for decelerating trains and/or for bringing it to a stop at the desired location.

Such modular TDS segments may be placed temporarily along a segment of the railway or be placed permanently to routinely decelerate trains—alone or together with the train braking system—thereby reducing rail, wheel and brake wear. The equipped railway segment may also be kept inactive, thereby acting as a regular railway segment, and be activated only when needed, such as in an emergency.

The TDS mechanisms may be equipped with the disclosed or the like mechanical to electrical energy conversion systems to convert at least a portion of the train kinetic energy that is absorbed during train deceleration to electrical energy rather to wasted heat.

An objective is to provide the methods and the means to decelerate trains in general, and in particular for decelerating trains to bring them to stop at stations with and/or without assistance from the train braking system to minimize rail, wheel and brake system wear. Deceleration by braking is the result of the work done by the friction force between the rails and the wheels. In the present TDS, the deceleration is primarily due to the transfer of the train kinetic energy to potential and kinetic energy of the TDS for storage and later dissipation or transformation to electrical energy for other uses or transfer to the electrical grid.

Another objective is to provide the methods and the means of decelerating a runaway train and bringing to a stop at the railway ends as well as at any location along the railway. The latter is achieved by rapidly installing the required numbers of modular portable TDS rail side mechanisms at the desired location along the railway.

In the remainder of this description, the basic principles of operation and various embodiments of the present invention are described in terms of trains and railways. However, it is understood that whenever applicable, the terms also apply to other similar moving structures used to transport people and/or cargo that are constrained to move along predefined paths which, for example could be rail-type tracks or between two movement constraining surfaces, along a single constraining surface or along one or more cables and the like.

BRIEF DESCRIPTION OF THE DRAWINGS

These and other features, aspects, and advantages of the apparatus and methods will become better understood with regard to the following description, appended claims, and accompanying drawings where:

DETAILED DESCRIPTION

It is appreciated that all prior art embodiments are permanently installed at fixed locations and cannot therefore be deployed as needed along a section of the runway.

Figure 1:
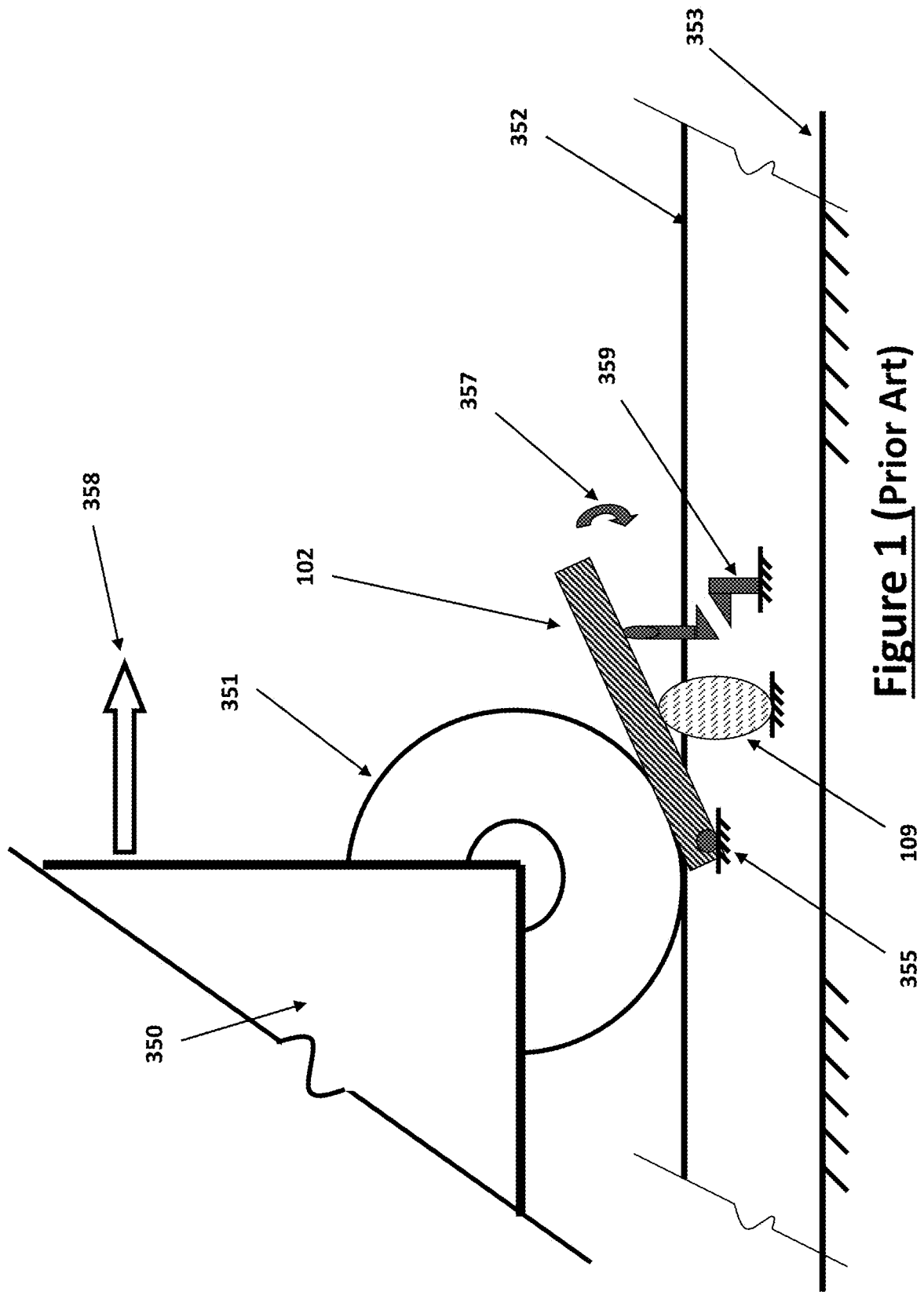
FIG. 1 illustrates one prior art embodiment of an apparatus for decelerating a train.
Figure 2:
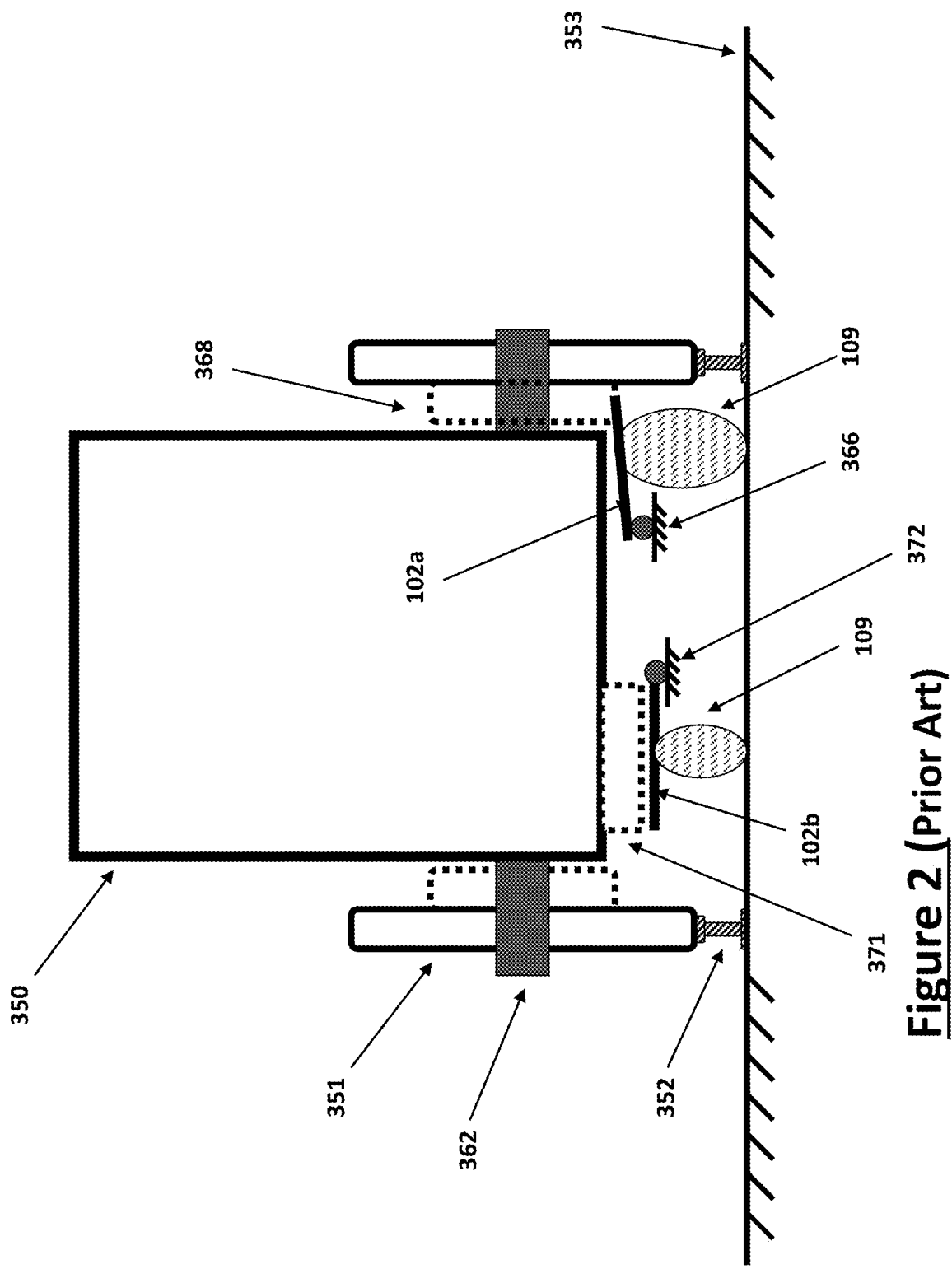
FIG. 2 illustrates a second prior art embodiment of an apparatus for decelerating a train.

In addition, in the prior art embodiments of FIG. 1 and FIG. 2, the weight of the train supported by the wheels travelling over the system panels (102, 102a and 102b in FIG. 1 and FIG. 2) deforms the provided elastic elements to transfer the train kinetic energy into potential energy, which is stored in the elastic elements while the engaging wheel travels over the panel. This process results in a lifting force to be applied to the train, thereby causing it to undergo and up and down motion when the train must be stopped in a relatively short distance, which could affect the performance of the train braking system (if applied) and discomfort and alarm the passengers.

Figure 3:
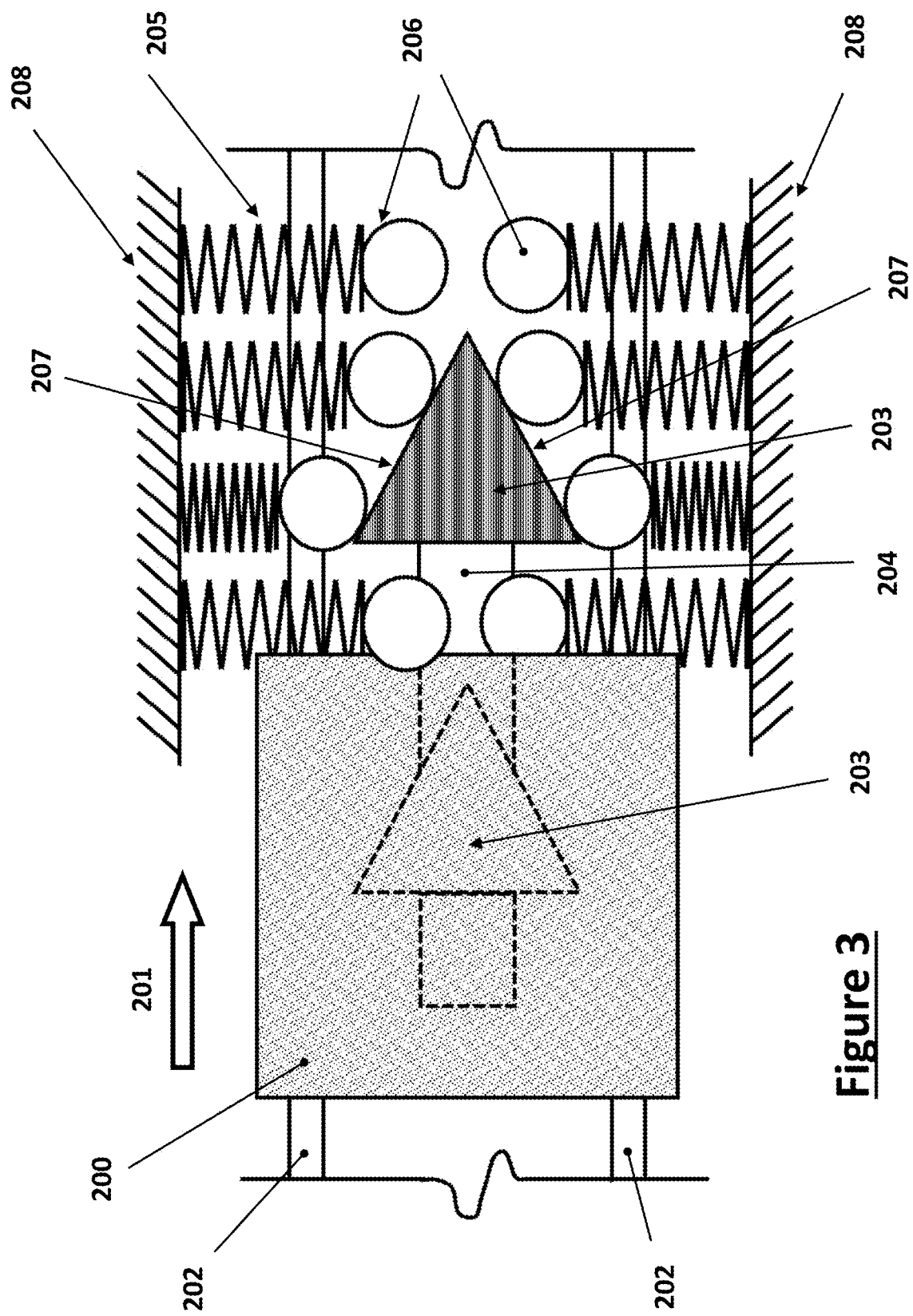
FIG. 3 illustrates the first embodiment of the modular, portable and rapidly deployable apparatus for decelerating a train.

The methods to design and operation of the "Train Decelerating System" (TDS) for slowing down trains and bringing them to stop or slowing them down to a safe speed level when they are moving above the safe speed level is herein described as applied to the first embodiment, the schematic of which is shown in FIG. 3.

In the schematic of FIG. 3 a frontal portion of a train 200 is shown travelling in the direction of the arrow 201 over the rails 202. Under the train chassis (not shown), a structure 204 is attached, which is provided with multiple wedge-shaped members 203 as shown in the schematic of FIG. 3. In the path of train travel along the segment of the railway that the train is desired to be slowed down, the "kinetic energy absorbing" units 205, such as compression springs, are provided. The "kinetic energy absorbing" units 205 include elastic element(s) for storing the train kinetic energy as potential energy, and that may also include viscous and/or dry friction type damping element(s) and other means of storing or transferring mechanical energy for dissipation and/or for conversion to electrical energy as will be described later in this disclosure.

The surfaces 207 of the wedge-shaped members 203 are preferably curved and the engaging members of the "kinetic energy absorbing" units 205 are "wheel" shaped 206 and are freely rotatable with high friction contact surfaces so that as they engage the surfaces 207 of the wedge-shaped members 203, they would rotate while depressing the unit 205 with minimal slippage.

Then as the moving train travels in the direction of the arrow 201, the surfaces 207 of the wedge-shaped members 203 engages the "wheel" shaped 206 members of the "kinetic energy absorbing" units 205, causing them to be depressed as the train moves forward. The kinetic energy of the train is thereby transferred to the "kinetic energy absorbing" units 205, causing the train to slow down. The kinetic energy absorbed by the "kinetic energy absorbing" units 205 is either dissipated or converted to electrical energy as is described later in this disclosure.

It will be appreciated by those skilled in the art that the train can be equipped with more than one engaging wedge-shaped members 203 as shown in the schematic of FIG. 3, and once one engaging wedge-shaped members 203 has depressed one "kinetic energy absorbing" units 205, it would engage a second "kinetic energy absorbing" units 205. In the meanwhile, the "kinetic energy absorbing" units 205 would return to or close to its normal (pre-depression) state by dissipating the absorbed mechanical energy or transferring it to some other mechanical energy storage and/or electrical energy generating system. The various possible types and designs of the "kinetic energy absorbing" units 205 and their operation are described later in this disclosure.

It will also be appreciated by those skilled in the art that the basic method and apparatus shown schematically in FIG. 3 for slowing down trains and bringing them to a stop or slowing them down to a safe speed level are configured not to apply a lifting force to the train and also do not absorb the train kinetic energy through friction between the rail and the wheel and the braking pads and the wheel or braking discs. The engaging wedge-shaped members 203 can apply horizontal forces to the "kinetic energy absorbing" units 205, which can essentially be balanced, so that essentially no lateral force is also applied to the train. In addition, since no lifting force is applied to the train, the level friction forces between the rail and the wheels is not affected, and the train braking system would still operate normally if needed to be used to increase the train deceleration rate.

It will also be appreciated by those skilled in the art that by minimizing braking induced wear between the brake pads and the wheel (or braking discs when used) and between the wheels and the rail, in addition to minimizing the wheel, brake and rail wear and thereby minimizing maintenance and service costs, the amount of metal and other particles that are generated as a result of the stated wear actions is also minimized. It is noted that the presence of metal and other particle concentration around the train stops pose health hazard to passengers and railway workers, particularly in underground subway stations, and it also causes clogging and shorting of electrical switch gear, etc., that cause train operation stoppage and delays and related operational and repair costs. It will also be appreciated that even when trains are driven electrically and braking forces are generated through the electrical motors acting in regenerative mode as electrical generators, the only component of the aforementioned friction based wear that is eliminated is between the wheel and the brake pads and the friction forces between the wheel and the rail are still present and needed to decelerate the train and their related wear is not eliminated.

In one embodiment, as shown in the schematic of FIG. 3, the "kinetic energy absorbing" units 205 are fixedly attached to the ground via strong foundations to support the forces transmitted as the kinetic energy absorbing units 205 are depressed by the engaging wedge-shaped members 203. In this embodiment, the disclosed system for slowing down trains and when desired bringing them to stop is permanently installed over a section of the railway.

In another alternative embodiment (not shown in FIG. 3), the "kinetic energy absorbing" units 205 can be fixedly attached to a second structure as is described later in this disclosure to form modular units that are portable and that can be readily installed along the desired section of the railway and disassembled when desired.

Figure 4:
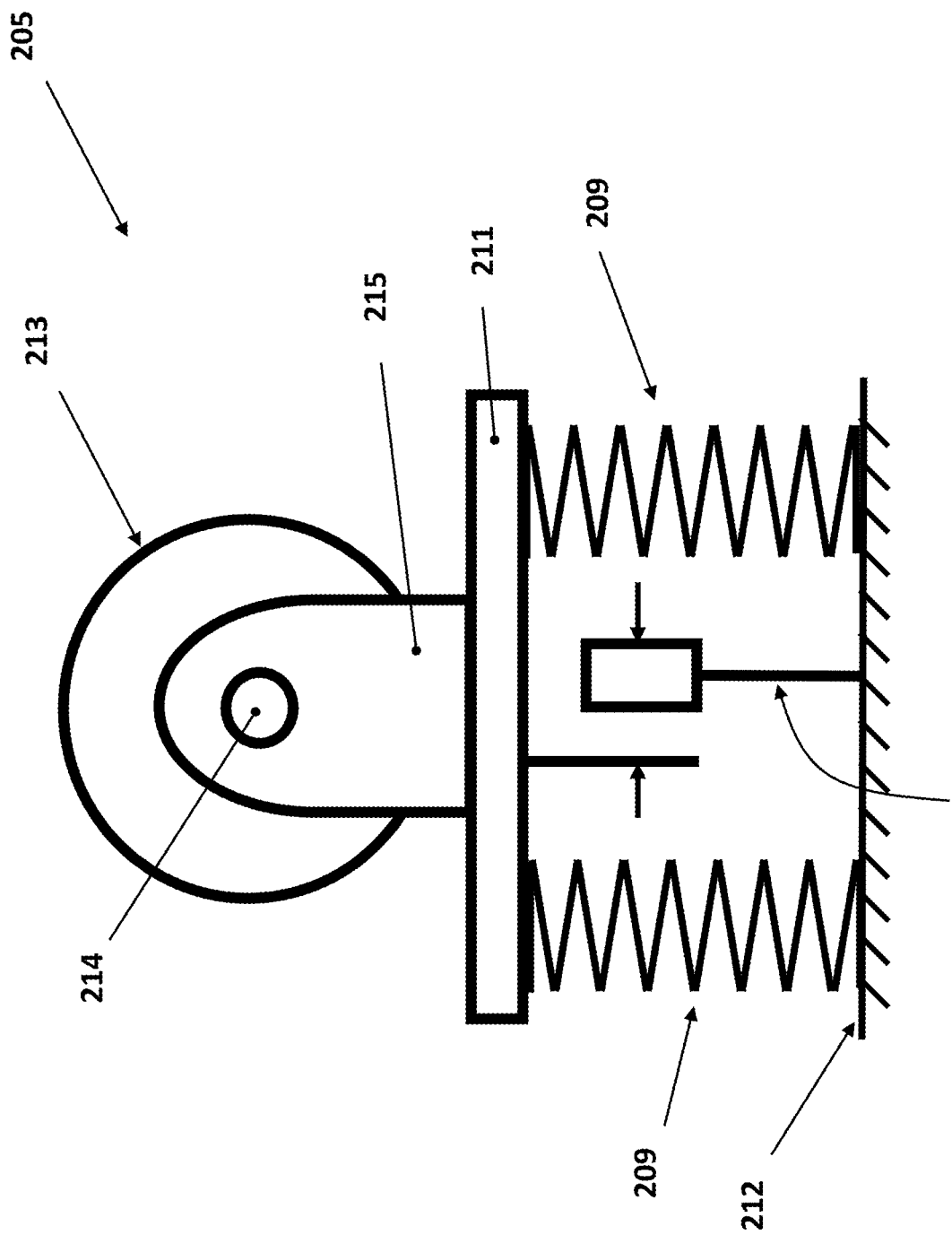
FIG. 4 illustrates a schematic of a single "kinetic energy absorbing" unit.

The structure of an exemplary "kinetic energy absorbing" unit 205 is shown in the schematic of FIG. 4. Such a kinetic energy absorbing unit consists of one or more spring elements 209 and one or more energy dissipating elements 210 connecting a relatively rigid panel 211 to the base structure 212 of the "Train Decelerating System" (TDS). A wheel shaped member 213 is also attached to the panel 211 via a hinge joint 214 provided in the support structure 215.

It will be appreciated by those skilled in the art that the spring elements 209 may be of any type, for example may be helical springs or Belville washers or may be air springs in which the potential energy is stored in them primarily as compressed air or may be hydraulically actuated compressed air or helical or the like spring units.

The operation of the TDS is equivalent to a vehicle traveling along an inclined surface, thereby transforming its kinetic energy into potential energy proportional to the vertical height that its center of mass attains. The kinetic energy of the vehicle is primarily transformed into potential energy stored in the deforming elastic elements, i.e., the springs 209, and dissipated in the energy dissipating elements 210.

In certain situations, a mechanical energy dissipating element 210 may be provided to dissipate part of the kinetic energy of the train by dry friction, i.e., by a braking mechanism, which are well known in the art, an option which is generally not desired for the present application, particularly for slowing down trains and bringing them to a stop at stations that are located in relatively closed spaces such as in subway station as was previously indicated. The energy dissipating element may dissipate part of the kinetic energy of the train by viscous damping, which also has the advantage of being readily adjustable, even actively by provided sensory signal received from a TDS control computer as is described later in this disclosure.

Yet in other situations and as it will be described later in this disclosure, it may be desired to use kinetic energy storage elements such as flywheels in series or in parallel with the elastic elements or even in place of the elastic elements. In a similar design, opposing magnet or magnets and coils (i.e., linear or rotary motors) may be used in parallel or in series with one or more of the aforementioned elements. Yet in certain other situations, electrical energy generators may be positioned in series or parallel with the elastic elements or in place of the elastic elements, or in series or parallel with the kinetic energy storage elements or in place of the kinetic energy storage elements. The electric energy generators or electric actuation devices (or in fact any other means of actuation) may be used as means to absorb part or the entire kinetic energy that is transferred to the wheel 213 of the "kinetic energy absorbing" units 205, or they may be used in part or entirely as means of controlling the rate of such energy transfers. The latter means of control is usually aimed at achieving a smoothly decelerating motion for the train.

In general, the spring rates, viscous damping rates, and the characteristics of any one of the aforementioned elements may be constant or adjustable. Such means of adjustment of the characteristics and parameters of the aforementioned elements may be used to adjust the characteristics of the "Train Decelerating System" (TDS), FIG. 3 to their near optimal conditions for each approaching train, its speed, and operating condition. The aforementioned elements may also have linear or nonlinear characteristics. The advantages and disadvantages of a number of aforementioned combinations and the general characteristics that they can provide the TDS system is described later in this disclosure.

In short, a number of combinations and configurations of one or more elastic elements, one or more kinetic energy storage elements, one or more viscous damping elements, one or more braking elements, one or more electrical or hydraulic or pneumatic motors or their combination, and one or more electrical energy generators may be positioned in series or in parallel to provide the desired effect of "absorbing" the kinetic energy of the train and when provided with mechanical to electrical energy conversion mechanisms, to transform a portion of the absorbed kinetic energy to electrical energy.

The wheel shaped members 213 of the "kinetic energy absorbing" units 205, FIG. 4, can be constructed with relatively rigid but lightweight materials. The surface of the wheel shaped members 213 can be coated with appropriately formulated material to enhance endurance, increase friction and decrease wear.

Figure 5:
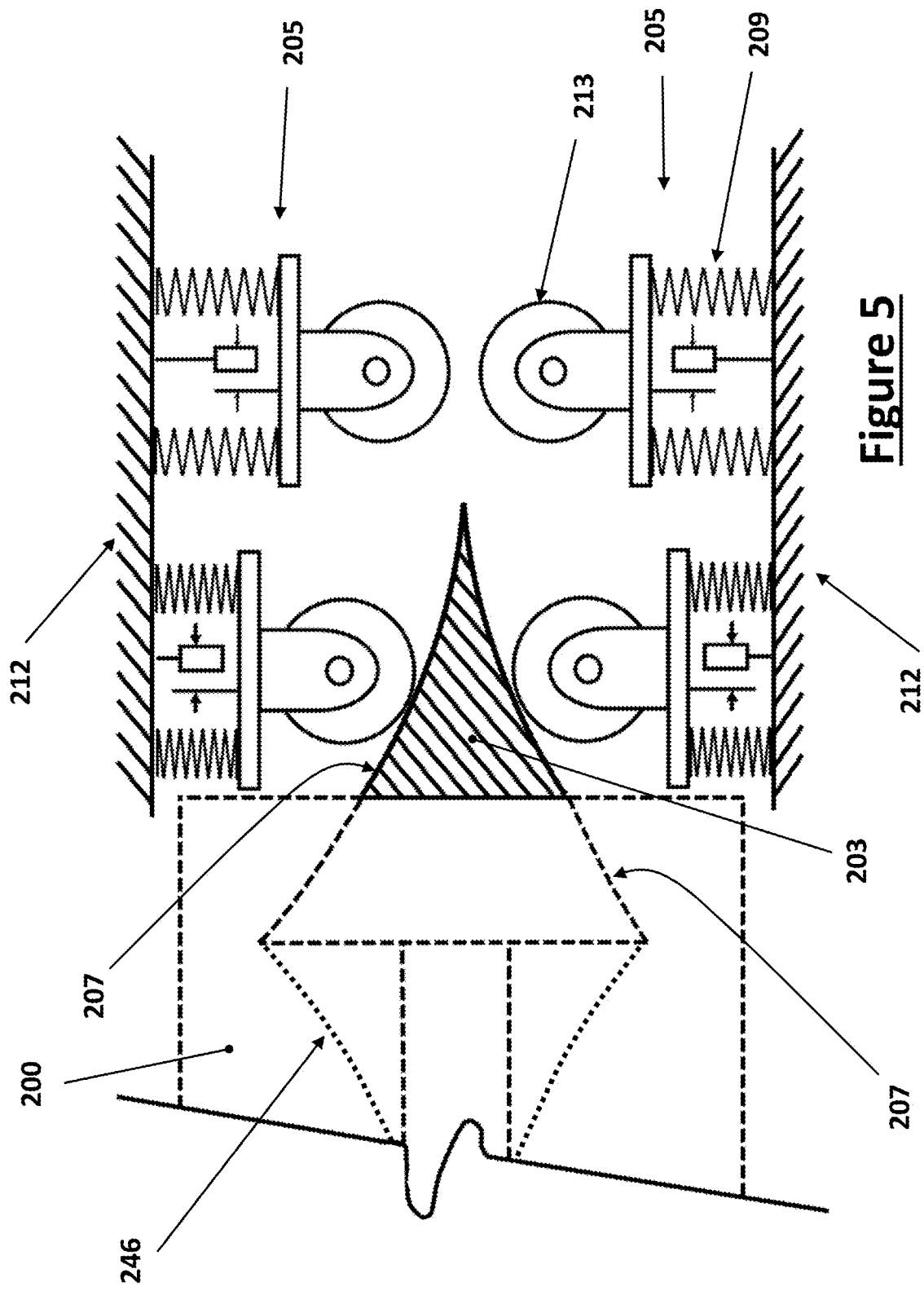
FIG. 5 illustrates the engagement of the train wedge-shaped member with the kinetic energy absorbing units.

Then as an engaging wedge-shaped member 203 of a train 200 (FIG. 3) encounters the wheels 213 of the kinetic energy absorbing units 205, the surface 207 of the wedge-shaped member 205 begins to force the wheels 213 away in as shown in FIG. 5. It is noted that in the schematic of FIG. 5, the surfaces 207 of the wedge-shaped member 205 are curved to allow for smooth engagement of the surfaces with the wheels 213 to achieve smooth train deceleration with minimal jerking, as is well known in the art for cam profile design. Then as the train moves forward, the contacting kinetic energy absorbing units are pushed away (laterally outward) by the wedge-shaped member 205 as shown in the schematic of FIG. 5, thereby compressively deforming the springs 209 of the kinetic energy absorbing units 205 and causing mechanical energy to be dissipated in the energy dissipating elements 210, FIG. 4, as described below.

Let a certain position of the wedge-shaped member 203 relative to the contacting kinetic energy absorbing units 205 the spring (elastic) elements 209 of the kinetic absorbing units to be deformed a distance D, as shown in FIG. 5. The spring rate of the spring elements can be adjustable and selected, i.e., set by a spring rate adjustment mechanism (not shown) such that the kinetic energy absorbed by the kinetic energy absorbing units 205 corresponds to the desired rate of deceleration of the train. The total amount of potential energy PE that is stored in the spring elements 209 of each kinetic energy absorbing unit 205 is readily shown to be $$PE = \tfrac{1}{2}kD^2 \tag{1}$$

where k is the effective spring rate of the spring elements 209 of each kinetic energy absorbing unit 205, assuming that the spring elements 209 are not pre-loaded. If the spring elements 209 are pre-loaded a distance Do, then the potential energy stored in the spring elements 209 is readily shown to be $$PE = \tfrac{1}{2}k(D+D_0)^2 - \tfrac{1}{2}kD_0^2 \tag{2}$$

In general, the spring elements 209 are desired to be pre-loaded in order to reduce the amount of displacement D for a desired level of potential energy PE.

The amount of energy dissipated in the energy dissipating elements 210 is dependent on the type of the element used. If the energy dissipating elements 210 is dry friction (braking device) type, then the dissipated energy is proportional to the friction force (which is proportional to the provided brake surface pressure and the brake pad coefficient of friction), and the brake pad displacement, i.e., generally the aforementioned distance D. The amount of mechanical energy dissipated in viscous damping type energy dissipating elements 210 is dependent on the speed of the energy dissipating element displacement, which is dependent on the instantaneous velocity of the train (wedge-shaped member 203, FIG. 5) and the curvature of the surfaces 207, FIG. 5, and the type of viscous damping element being used, as they are well known in the art.

It will be appreciated by those skilled in the art that the Train Decelerating System (TDS) embodiment illustrated in the schematics of FIG. 3 and FIG. 5 can have its train mounted component, i.e., the at least one wedge-shaped member 203, FIG. 5, mounted under the train body, and since the TDS system kinetic energy absorbing units 205 are mounted and actuate in the horizontal plane, the forces acting on the kinetic energy absorbing units 205 also lie in the horizontal plane (essentially in the same horizontal plane since the kinetic energy absorbing units 205 can be mounted in the same horizontal plane), therefore the TDS system does not have a tendency to lift the train and thereby reduce its wheel traction with the rail. In addition, since identical kinetic energy absorbing units 205 are symmetrically mounted on both sides of the engaging wedge-shape member 203, therefore essentially no net lateral force would also act on the train body during its deceleration by the TDS system. It will also be appreciated by those skilled in the art that for the same reasons, essentially no tilting or twisting moments would also act on the decelerating train.

It will also be appreciated by those skilled in the art that kinetic energy absorbing units 205, FIG. 5, are attached to the base structure 212, which should be strong enough to withstand the forces (axial in the direction normal to the direction of the train travel and lateral in the direction of the train travel) as well as the moments (mainly about the direction normal to horizontal plane) and other relatively smaller forces and moments that are generated during the train deceleration process that was previously described.

It will be appreciated that the base structure 212, FIG. 5, may be a fixed structure that is constructed on either side of the rails and/or between the rails. The base structure 212 on both sides of the rails can be tied together laterally by high tensile force supporting elements positioned perpendicular to the direction of train travel (parallel to the rail ties) to support the aforementioned forces exerted by the kinetic energy absorbing units 205. Alternatively, the structure of the base structure 212 (similar to the "U" shaped base 216 of FIG. 6) may be bolted or welded to the inside of the rails.

This option for the TDS system base structure 212 is appropriate when the TDS system is desired to be permanently installed for decelerating trains, such as at railroad stations and particularly at subway stations, where regular braking (by braking pads or via regenerating generators) causes metal "dust" to fill the station environment, particularly in relatively closed environment of subway station, which introduces a serious health hazard to the passengers and the train crews and that can collect over electrical switching and lines and cause electrical shorting and damage.

Alternatively, the base structure 212, FIG. 5, may be portable and modular, so that the rail side of the TDS system can be readily installed where needed and readily removed when no longer needed. The modular design of the TDS also allows the installment of as many kinetic energy absorbing units 205 as needed depending on the expected train weight and speed and if the TDS is to be used to stop the train or lower its speed to a safe level. Additionally, a series a wedge shaped members 203 can be provided longitudinally along the length of the train.

For quick installment of the portable and modular base structure 212, the base structure can be fixed to the rails. As previously described, the base structure 212 must be capable to support forces exerted by the wedge-shaped member 203, FIG. 5, mounted under the train body both in the direction of train travel, i.e., parallel to the rails, as well as in the lateral direction via the kinetic energy absorbing units 205. The above forces are the main forces that the base structure 212 must be capable of supporting. The lateral forces are applied in opposite directions (outward as viewed in the schematic of FIG. 5) as the wedge-shaped member 203 deforms the kinetic energy absorbing units 205 in the direction of the rails. In addition, since pairs of facing kinetic energy absorbing units 205 are essentially identical, therefore they exert nearly equal and opposite forces to the base structure 212. For this reason, to minimize the lateral forces that are transferred to the "ground" by the base structure 212, for example by anchoring it directly to the ground or attaching it to the rails or to the rail ties, the base structure 212 may be provided with "tension" support elements that connect the base structure on the opposite sides of the rail, similar to the underlying rail ties. Examples of such modular and portable base structure 212 construction and methods of their installment and their design for supporting the aforementioned forces are described below.

Figure 6:
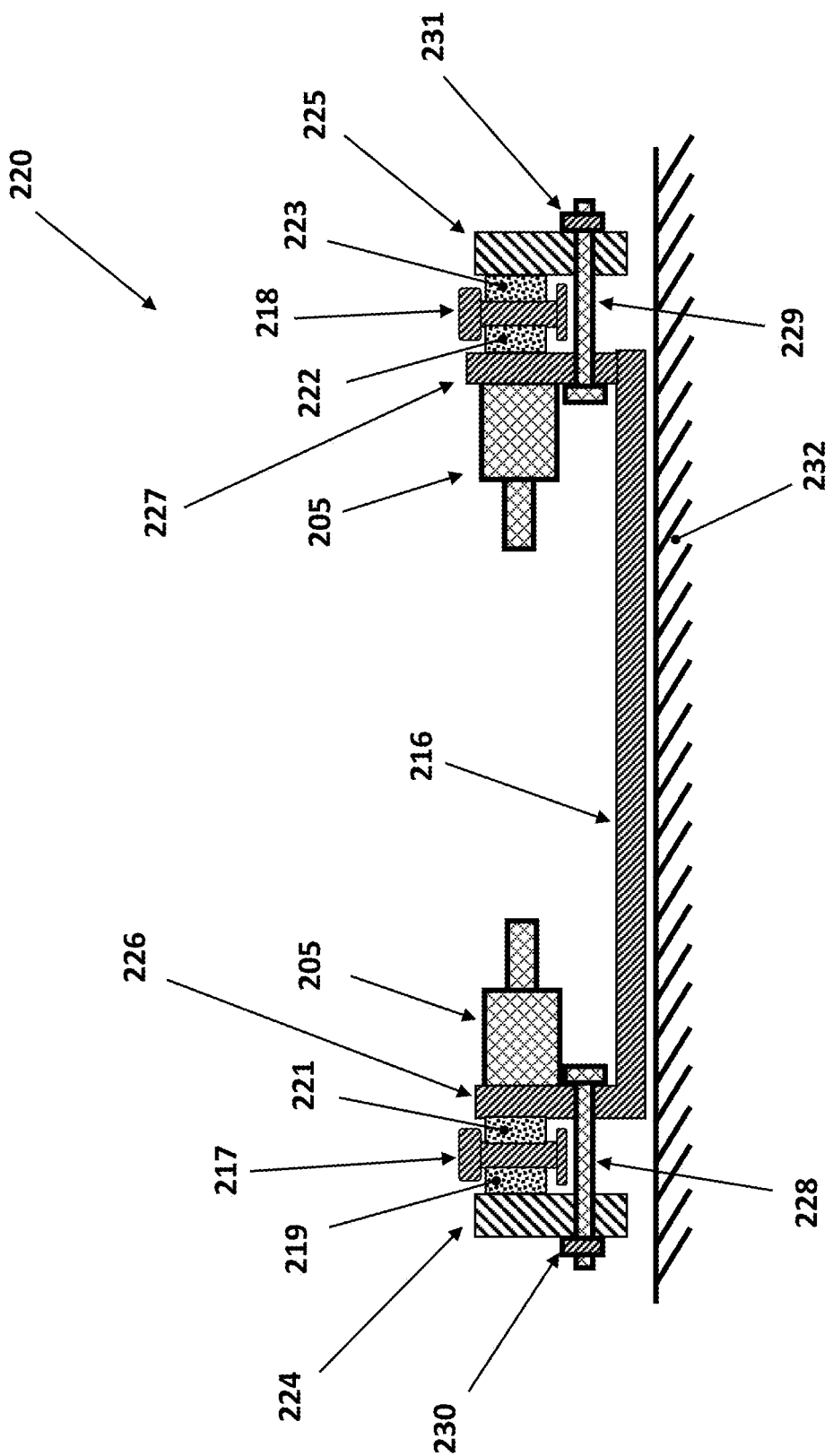
FIG. 6 illustrates a schematic of the cross-sectional view of a portable and modular base structure for the "Train Decelerating System" (TDS).

A cross-sectional view of a unit of a portable and modular base structure 212, indicated by the numeral 220, is shown in the schematic of FIG. 6. Each portable and modular base structure unit 220 consists of a "U" shaped base 216, which is positioned between the rails 217 and 218. At least one pair of kinetic energy absorbing units 205 is fixedly attached to each "U" shaped base 216. The structure of the "U" shaped base 216 is designed to resist the forces applied by the kinetic energy absorbing units 205 as they engage the wedge-shaped member 203, FIG. 5, of the decelerating train. It will be appreciated that the forces being applied by the kinetic energy absorbing units 205 would essentially subject the side structures of the "U" shaped base 216 to bending and its base structure to tensile loading. And since pairs of kinetic energy absorbing units 205 are positioned symmetrically with respect to the wedge-shaped member 203, there would essentially be negligible resultant lateral force to be transferred to the ground (or the rails or the rail ties).

The forces applied to the portable and modular base structure unit 220 in the direction of train travel, i.e., the forces applied to the kinetic energy absorbing units 205 in the direction parallel to the rails 217 and 218 as they engage the wedge-shaped member 203 are transferred to the said rails as they would have when the train uses the wheel braking and/or regenerating generators for deceleration. In the embodiment of the portable and modular base structure unit 220 shown in the schematic of FIG. 6, such forces are transferred to the rails by high friction spacers 219 (222) and 221 (223) provided on the opposite sides of the rail 217 (218), which are sandwiched between effectively rigid plates 224 (225) and the sides 226 (227) of the "U" shaped base 216. The bolts 228 (229) with nuts 230 (231) are then provided to keep the sandwiched layers under the required pressure to resist the forces applied to the kinetic energy absorbing units 205 in the direction parallel to the rails. The bolts 228 and 229 are passed under the indicated rails between the rail ties (not shown in FIG. 6) above the ground 232. In general, Bellville type washers can be used under the nuts 230 (231) so that the provided pressure by the tightening of the nuts are sustained and are not lost due to vibration, temperature variation and the like.

It will be appreciated by those skilled in the art that since the distance between the rails is held constant and is fixed, one or both of the high friction spacers 221 and 222 can be configured as two sliding wedges to fit the gap with the side of the rail once the "U" shaped base 216 is positioned between the rails and one of the bolts 228 and 229 has been fully secured and tightened during the portable and modular base structure unit 220 assembly.

It will also be appreciated by those skilled in the art that the portable and modular base structure unit 220 assembly may also be designed in various other configurations and use other means of connection to the rails. For example, the bolts 228 (229) with nuts 230 (231) on one or both sides of the portable and modular base structure unit 220 may be replaced by hydraulic pistons, thereby allowing the exerted pressure to be controlled and make the system assembly significantly faster. Alternatively, a cam locking mechanism, wedge shaped self-locking mechanisms or other mechanisms known in the art may be used to achieve faster portable and modular base structure unit 220 installation and reducing the total system weight.

It is appreciated that the kinetic energy absorbing units 205 shown schematically in FIG. 4 is constructed with passive elements, i.e., with springs 209 and dry friction and/or viscous type damper 210 (mechanical energy dissipating) elements. Such passive elements may be adjustable by the user to achieve an optimal train deceleration depending on each application. Such adjustable springs, for example readily spring rate adjustable air springs, and adjustable viscous dampers with various force versus speed profiles are well known in the art and may be readily used in the construction of kinetic energy absorbing units 205.

Alternatively, the kinetic energy absorbing units 205 shown schematically in FIG. 4 may be constructed with active elements or a combination of active and passive elements. For example, the spring elements 209 may be air springs in which the air pressure is actively regulated to achieve the desired spring rate. The resisting force of dry friction (brake type) mechanical energy absorbing elements 210 are readily adjustable by actively controlled hydraulic pressure like those used in vehicles. The force versus velocity profile of viscous type dampers 210 is readily controlled by varying the damper hydraulic fluid return orifice or the like. Such active springs 209 and dry friction and/or viscous type damper 210 (mechanical energy dissipating) elements are well known in the art and are readily controllable by a properly programmed computer software, the basic operation of which for different applications is described later in this disclosure.

It is noted that herein active components are intended to indicate those components that are controlled by sensory inputs. The means of generating control action may be a closed loop control system or directed or assisted by a software driven processor. However, it will be appreciated by those skilled in the art that individual elements of the TDS, such as the viscous type damping elements or the air springs may be provided with passive or adaptive means of adjusting their parameters depending on their own sensory inputs. For example, the viscous damper type elements may be provided with active or passive means of adjusting its rates depending on their input velocity, i.e., rate of deformation during train deceleration.

It will be appreciated that hereinafter when referring to the train conductor or ground or station personnel, the reference also included computerized and automated systems that are used to make the related decisions and perform or initiate the performance of the related tasks.

It will be appreciated by those skilled in the art that a TDS with active components is a significantly more complex system than one with purely passive components. As a result, a TDS with active components may be more suitable for stationary installments, such as for installment at train stations and subway stations. It is, however, appreciated that fully automatic TDS systems with active components provide the following capabilities:

1. The fully automatic TDS system with active components can be used to smoothly bring the train to a stop at a desired location or reduce its speed to a desired level.
2. The TDS system may be activated and deactivated by deploying or retracting the kinetic energy absorbing units 205, FIG. 4, by the ground personnel. The system may also be provided with remotely operated capability, for example, via radio operated signals, for activation/deactivation by the train conductor.
3. The TDS system may be provided with sensors that measures the speed of incoming trains and if the speed is above a prescribed threshold, would properly set the parameters of the components of the kinetic energy absorbing units 205 to smoothly and safely bring the train to a stop within a prescribed distance or location or slow down its speed to a prescribed level.
4. The TDS system with active components may be designed and configured to operate in a closed-loop mode, i.e., vary the parameters of the active components in a closed-loop configuration with train speed and/or position and/or acceleration as sensory inputs, or may operate in an open-loop mode, in which the parameters of the active components are set from the train speed and/or position and/or acceleration sensory inputs, but is and left unchanged as the train is decelerated to a stop or to a reduced speed level.
5. The TDS system may be configured so that the deceleration rate of the train may be controlled by either train conductor or the ground personnel or both.
6. The TDS system may be configured so that at locations where the train is running at speeds that are higher than a safe speed limit—at least as an auxiliary safety system—to automatically deploy to lower the speed to a prescribed safe level.
7. The TDS system may be configured to be deployed automatically as the train enters a station that is the end of the line and the system parameters be automatically set to bring the train to a smooth and complete stop and avoid collision with the rail end bumpers.

It will be appreciated by those skilled in the art that the use of the TDS system does not preclude the use of currently used braking systems. In fact, since the rail-side component of the TDS system may not be installed along all railways, but mainly at railway stations and subway stations and for safety reasons at locations prone to derailing due to high rates of speed, thereby all trains can still be equipped with currently used wheel braking and electrical regeneration braking systems for use as needed during the train travel.

In the schematics of FIGS. 3 and 5, the wedge-shaped members 203 are shown to be fixed to the bottom surface of train and at the level of engagement with the wheel shaped members 213 of the kinetic energy absorbing units 205. With TDS systems working with fixed wedge-shaped members 203 on the trains, the TDS system may only be activated and deactivated by deploying or retracting the kinetic energy absorbing units 205, FIG. 4, by the ground personnel or remotely by the train conductor. Such TDS systems may have certain advantages since there are significantly more trains than train stations. In addition, it may be significantly easier and more cost effective to equip train stations with the sensory systems for automatic and optimal operation of the system. In addition, for the case of a runaway train or those going faster than safe speeds, the conductor is usually at fault or is incapacitated and cannot be relied on to properly and timely deploy the TDS system. However, when appropriate, the wedge-shaped members 203 may also be designed to be deployable by the train conductor and/or the ground personnel. Such alternative embodiments are described below.

Various methods may be used to disengage the wedge-shaped members 203, (FIGS. 3 and 5) on the trains with the deployed kinetic energy absorbing units 205, FIG. 4. In a first method, the wedge-shaped members 203 are retracted up above, or moved down away from the level of engagement with the wheel shaped members 213 of the kinetic energy absorbing units 205. In a second method, the wedge-shaped members 203 are constructed of two parts, which can be retracted away from the deployed kinetic energy absorbing units 205. Examples of possible construction of each of such methods are described below.

Figure 7:
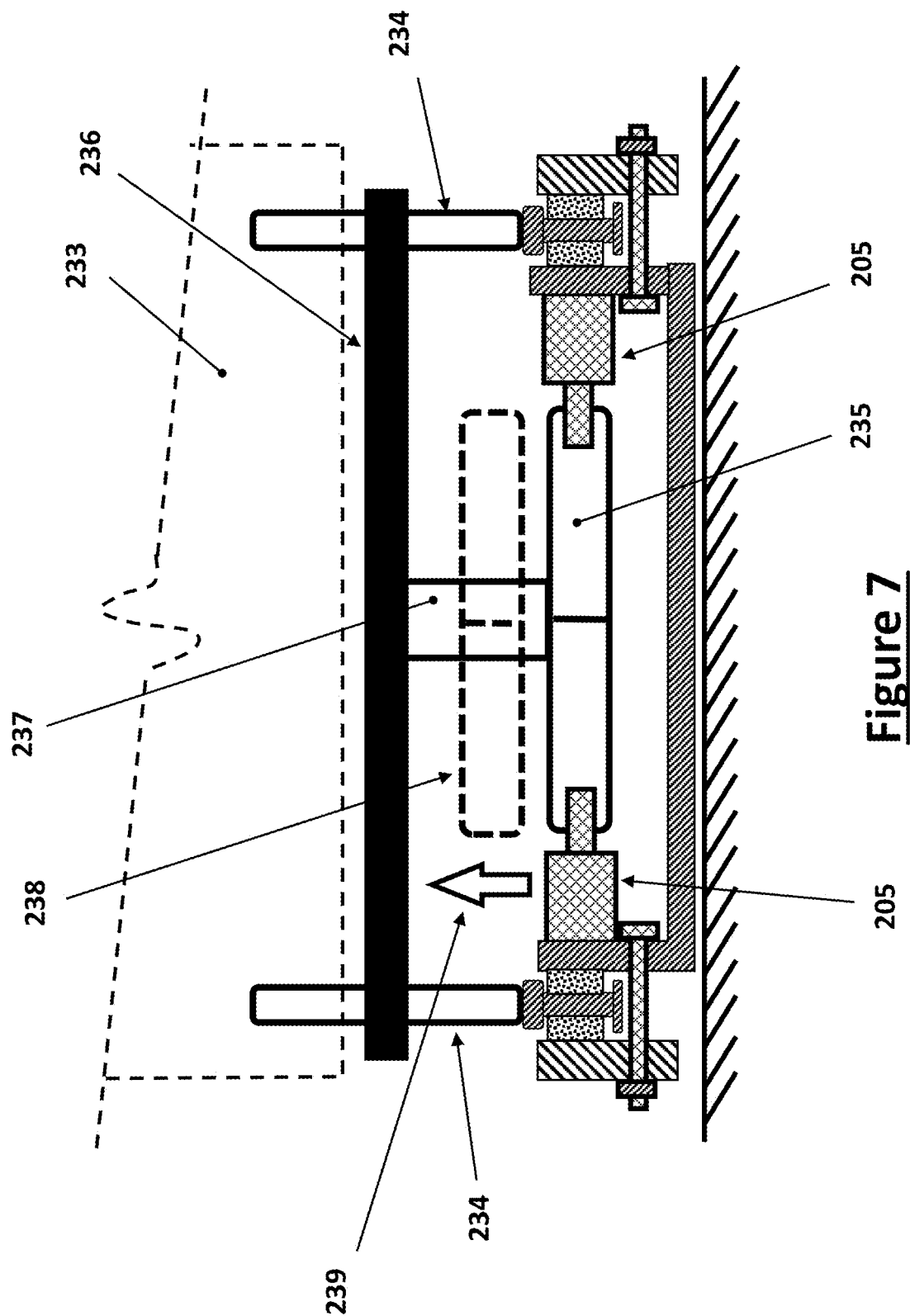
FIG. 7 illustrates a mechanism for engaging and disengaging the train mounted wedge-shaped component of the TDS.

The first embodiment of the disengagement mechanism for the wedge-shaped members 203, FIGS. 3 and 5, is shown in the schematic of FIG. 7. In this schematic, an incoming train 233 is shown with wheels 234 approaching the kinetic energy absorbing units 205 of the TDS ground system shown in the schematic of FIG. 6. In FIG. 7, the wedge-shaped members 235 (203 in FIG. 5) is shown to be attached to the train chassis 236 by the actuation device 237. The actuation device may be actuated by a pneumatic piston (not shown) to move the wedge-shaped members 235 from a deployed position shown in solid line for engagement with the wheel shaped members 213 of the kinetic energy absorbing units 205, FIG. 5, to its disengaged position 238 shown with dashed lines in the direction of the arrow 239 and vice versa.

Figure 8:
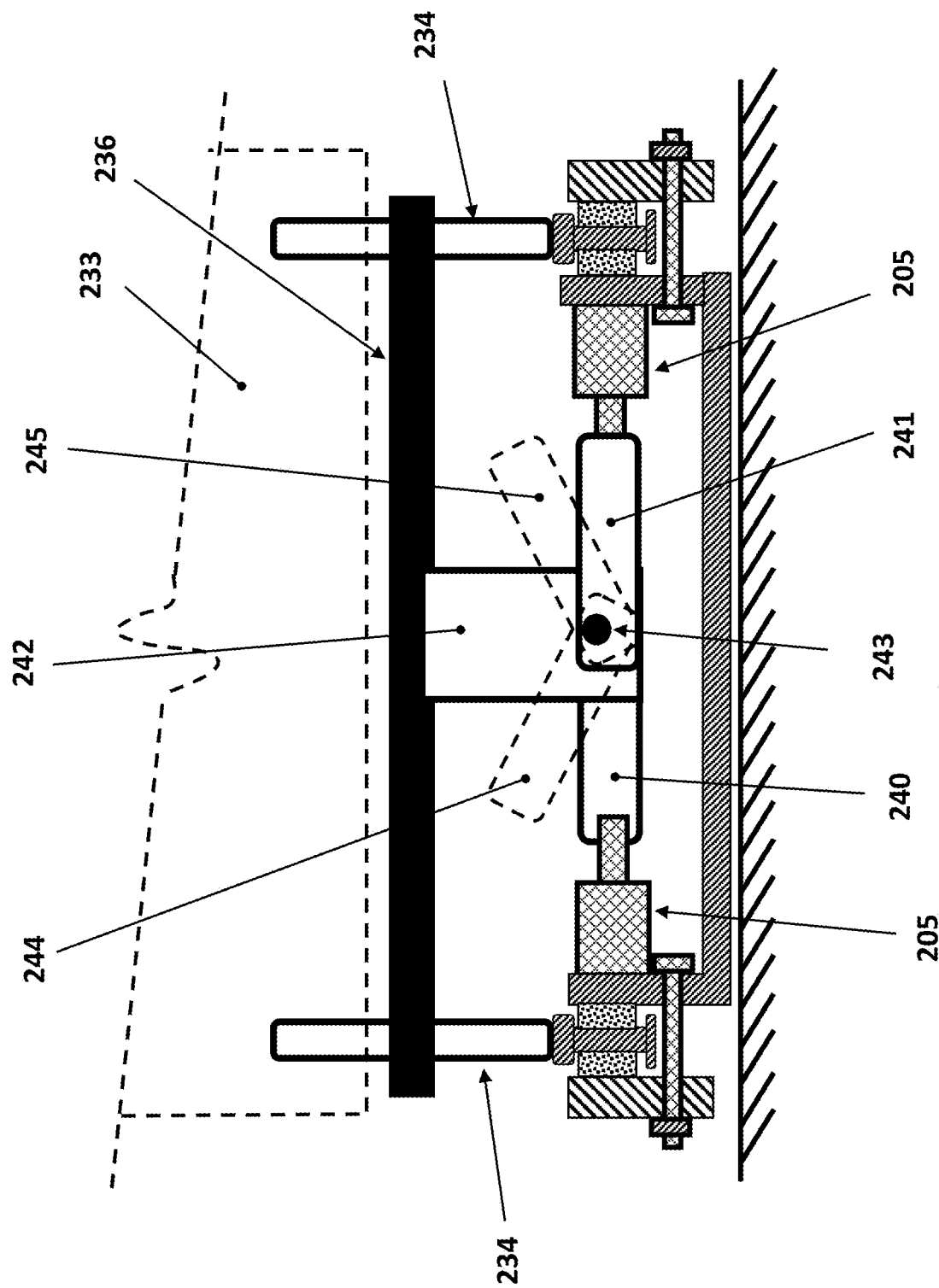
FIG. 8 illustrates another mechanism for engaging and disengaging the train mounted wedge-shaped component of the TDS.

The second embodiment of the disengagement mechanism for the wedge-shaped members 203, FIGS. 3 and 5, is shown in the schematic of FIG. 8. The schematic of FIG. 8 is identical to that of FIG. 7, except for the wedge-shaped member and its deployment and retraction mechanism. In this schematic, an incoming train 233 is also shown with wheels 234 approaching the kinetic energy absorbing units 205 of the TDS ground system shown in the 242 schematic of FIG. 6. In FIG. 8, the wedge-shaped member is constructed with two halves 240 and 241, which are attached to the train chassis 236 via a relatively rigid structure 242 by a rotary joint 243. In the schematic of FIG. 8, the wedge-shaped halves 240 and 241 are shown in their deployed configuration with solid lines. Once deployed, the top view of the wedge-shaped halves 240 and 241 would have the shape of the wedge-shaped member 203 of FIG. 3. The relatively rigid structure 242 is also provided with an actuator (not shown—such as a pneumatic type) that is used to rotate the wedge-shaped halves 240 and 241 to their positions 244 and 245, respectively, as shown with dashed lines in FIG. 8. In their deployed positions, the hinge 243 is desired to be positioned above the center of pressure of the decelerating forces applied by the wheel shaped members 213 of the kinetic energy absorbing units 205, FIG. 5, to the side surfaces (207 in FIG. 5) of the wedge-shaped halves 240 and 241. As a result, the decelerating forces would tend to keep the wedge-shaped halves 240 and 241 in their deployed positions.

It is appreciated by those skilled in the art that the TDS system may be used in place of (or in addition to) currently used "bumper" systems positioned at the end of the rail lines in end stations and the like. As a result, runaway trains can be brought to a stop safely and smoothly without causing damage to the station structure or the train and injury to its passengers and crew.

It will also be appreciated by those skilled in the art that in many cases, trains run in both directions. In such cases, the wedge-shaped members 203 of FIG. 5, must be provided with identical mirror image members 246 as shown partially with dotted lines in FIG. 5. As a result, a train moving to the left as viewed in the schematic of FIG. 5 can be decelerated as was previously described. However, in this embodiment, the potential energy stored in the spring elements 209, FIG. 4, of the kinetic energy absorbing units 205 must be prevented from accelerating the train once the wedge-shaped members 246 have passed the wheel shaped members 213 of the kinetic energy absorbing units 205 and come into contact with the side surfaces 207 of the wedge-shaped members 203 and begin to applying an accelerating force to the train. This can be readily accomplished using at least one of the following methods.

A first method consists of locking the kinetic energy absorbing units 205 in its maximum deformed position by the wedge-shaped member 246 and keeping it locked as it passes the side surfaces 207 of the wedge-shaped members 203. The kinetic energy absorbing units 205 are then released for engagement with the next wedge-shaped members 246. The locking mechanism may be by the dry friction and/or viscous type damper 210 member, for example by actuating the dry friction member (braking element when present) or by providing an active valve to open/close the viscous fluid flow into or out of the viscous damper as is well known in the art. Other passive methods, such as those based on mechanisms actuated by the wedge-shaped member 246 and/or 203 that are positioned along the rail may also be used. The same method is used when the train is traveling in the opposite direction to prevent train deceleration by the wedge-shaped member 203 and then acceleration by the mirror image wedge-shaped member.

The second method is based on using an actively controlled system in which once the kinetic energy absorbing units 205 has reached its maximum deformed position by the wedge-shaped member 246, an actuation device, such as a pneumatic or hydraulic piston or electrical motor or solenoid (not shown) is used to keep the unit 205 in its deformed position as it passes the side surfaces 207 of the wedge-shaped members 203. The actuation device may, for example, be used to act as a brake by applying an added force to the dry friction element of the member 210 or actuate a valve to close the fluid flow in the viscous damper element of the member 210. Alternatively, the actuator element (such as a pneumatic or hydraulic piston type) may be used to connect the rigid panel 211 to the base 212 of the kinetic energy absorbing units 205 to lock the units in their maximum deformed positions as described above and release them thereafter.

As was previously described, as the train engages the TDS system, the wedge-shaped members (e.g., the member 203 shown in FIG. 5) engages the kinetic energy absorbing units 205, thereby compressively deforming the springs 209 (or other potential energy storing elements as was previously indicated), thereby transferring a portion of the train's kinetic energy to be stored as potential energy in each of the encountered potential energy storing elements.

The kinetic energy of the train that is absorbed by the kinetic energy absorbing units 205 and stored in the mechanical potential energy storage devices, such as the springs 209, FIGS. 4 and 5, may then be converted to electrical energy while the kinetic energy absorbing units 205 is returning to it pre-deformed configuration after passing the wedge-shaped member (203 in FIG. 5) and prior to engagement with the next wedge-shaped member 203.

It will be appreciated by those skilled in the art that the mechanical potential energy to electrical energy conversion system may also be configured to directly or via a flywheel convert at least a portion of the kinetic energy of the train to electrical energy during the wedge-shaped member (203 in FIG. 5) engagement with the kinetic energy absorbing units 205. The different configurations and embodiments of train kinetic energy to electrical energy conversion mechanisms are described later in this disclosure.

It will be appreciated that all or at least a major portion of the train kinetic energy is desired to be converted to electrical energy to minimize energy losses and maximize the amount of electrical energy that is recovered during train deceleration.

Figure 9:
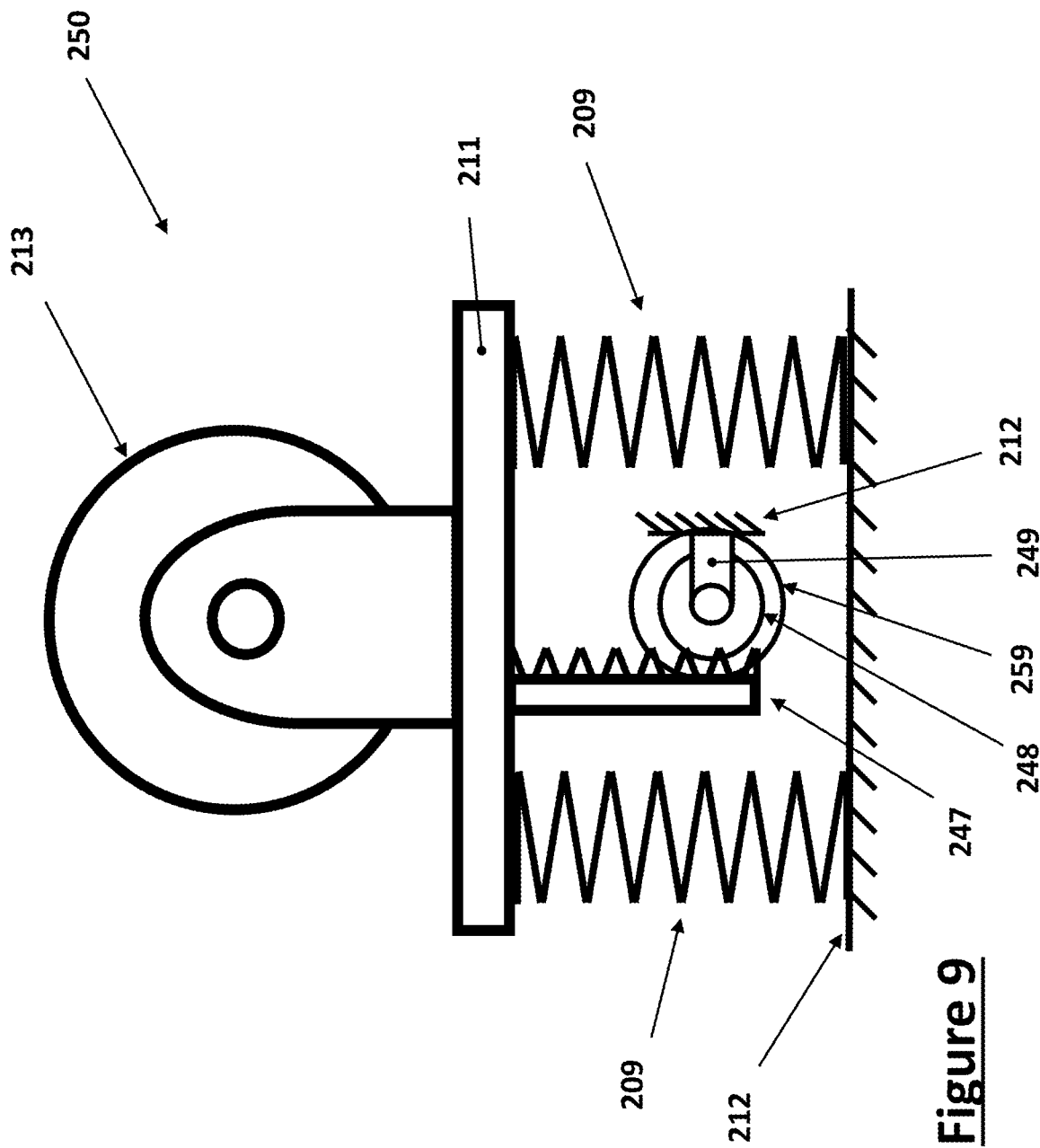
FIG. 9 illustrates a schematic of a single "kinetic energy absorbing" unit for storing mechanical potential energy and converting it to electrical energy.

The schematic of one embodiment of kinetic energy absorbing unit that is provided with a mechanical potential energy storage (spring) element and mechanical potential energy to electrical energy conversion mechanisms is shown in FIG. 9 and hereinafter referred to as "kinetic energy to electrical energy conversion units" 250. The kinetic energy to electrical energy conversion units 250 are identical to the kinetic energy absorbing units 205 of FIG. 4, but are also provided with the additional means of converting mechanical energy to electrical energy. In the schematic of FIG. 9 the dry friction and/or viscous type damper member 210, FIG. 4, is not shown for the sake of clarity, but may also be provided.

The kinetic energy to electrical energy conversion units 250 absorb a portion of the kinetic energy of the train as was described previously for the kinetic energy absorbing units 205, FIGS. 4 and 5, store part or nearly all of it (if no dry friction and/or viscous type damper member 210 is provided or is provided but is not activated) in the unit's spring (elastic) members 209 as mechanical potential energy. This process continues while the wheel 213 of a kinetic energy to electrical energy conversion unit 250 is engaged with the surface 207 of the wedge-shaped member 203 of a train 200 (FIGS. 3 and 5) and the spring members 209 are being compressively deformed. Then once the wedge-shaped member 203 has passed the kinetic energy to electrical energy conversion unit 250, the mechanical potential energy stored in the spring (elastic) members 209 would begin to force the rigid panel 211 back to its pre-wedge-shaped member engagement position. The portion of the kinetic energy of the train transferred to the kinetic energy to electrical energy conversion unit 250 is then converted to electrical energy as follows.

In one embodiment, a gear rack 247 is fixedly attached to the rigid panel 211 of the kinetic energy to electrical energy conversion units 250 as shown in FIG. 9. The rack 247 engages a gear 248 which is mounted directly on the shaft of an electrical generator 259 behind the gear 248 in FIG. 9. The generator 259 is attached to the base structure 212 of the unit 250 via a stand 249. Then as the rigid panel 211 moves down during the train engagement with the unit 250 and as the spring members 209 are returning the rigid panel 211 back to its pre-engagement position after the wedged-shaped member 203 has passed the unit 250, the rack 247 rotates the gear 248 and thereby the shaft of the connecting electrical generator, thereby causing it to generate electrical energy. The generated electrical energy can then be transferred to a collecting power line or used to power certain intended devices or stored for later use.

It will be appreciated by those skilled in the art that if the train is traveling at relatively high speed, then the rigid panel 211 is pushed down very rapidly, which might cause damage to the rack and gear and electrical generator assembly. In such cases, a one-way clutch can be provided between the gear 248 and the shaft of the electrical generator and can be configured such that the gear is free to rotate during downward motion of the rack 247 and engages the shaft of the electrical generator only while the rigid panel 211 is moving back up to its initial pre-engagement position. Such use of one-way clutch to allow for one-way transmission of torque from a gear to a shaft is well known in the art.

It will also be appreciated by those skilled in the art that to maximize the transfer of kinetic energy from a first system (in this case the train) for storage as mechanical energy in another system at high speeds (speed of train in this case) for consequent conversion to electrical energy may be achieved by transferring the kinetic energy of the train to a kinetic energy storage device, i.e., a flywheel, via a one-way clutch, and then convert the kinetic energy stored in the flywheel to electrical energy over a significantly longer time duration. This method also allows for multiple engagement of the wedge-shaped member 203 with a kinetic energy to electrical energy conversion unit 250, with increasing amounts of kinetic energy being stored in the unit flywheel. In general, the spring members 209 are still needed to rapidly return the rigid panel 211 to its pre-engagement position following each encounter with a wedge-shaped member 203, FIG. 5. A flywheel equipped kinetic energy to electrical energy conversion unit is shown in the schematic of FIG. 10.

Figure 10:
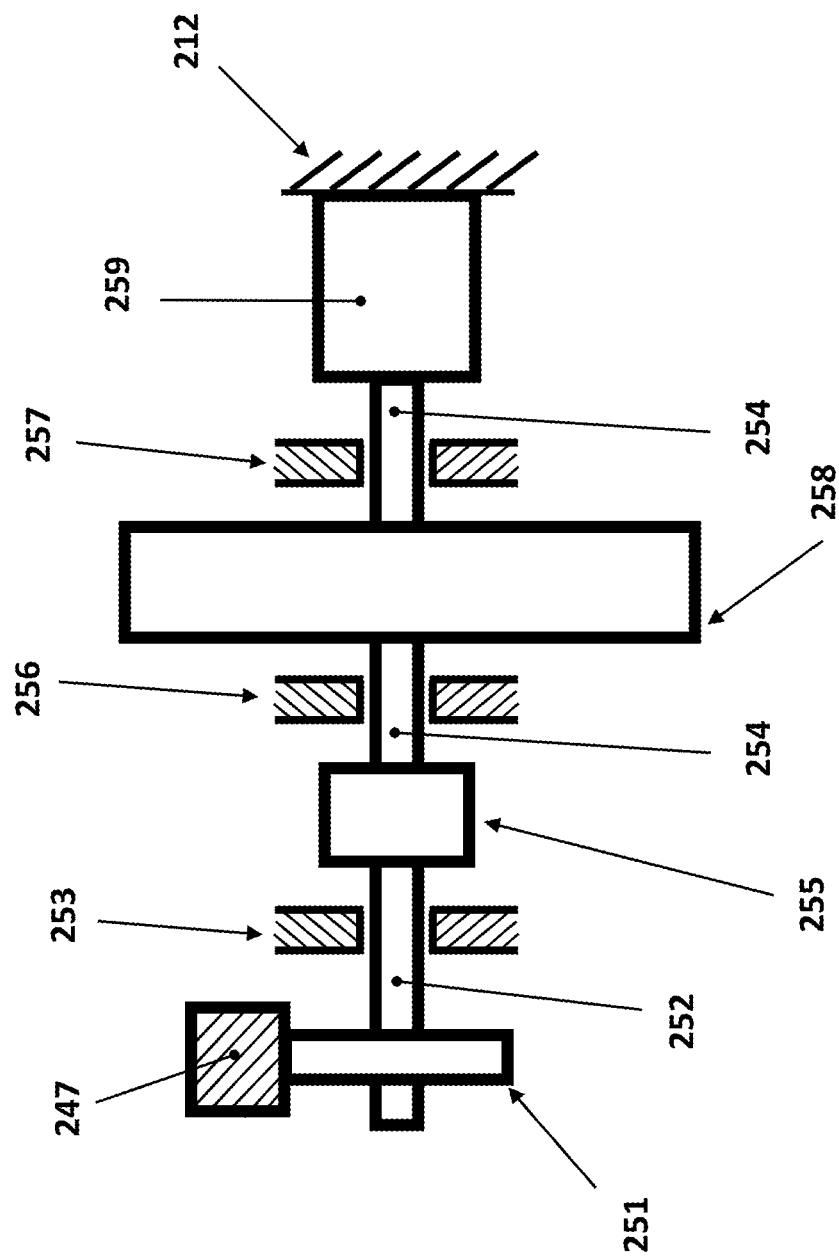
FIG. 10 illustrates a schematic of a "kinetic energy absorbing" unit capable of storing the transferred kinetic energy from the train in a flywheel as kinetic energy for converting to electrical energy.

The schematic FIG. 10. illustrates the alternative mechanisms provided to the kinetic energy to electrical energy conversion unit 250 that makes it capable of rapidly transferring a portion of the kinetic energy of a train that is moving at a relatively fast speed to a flywheel for storage and conversion to electrical energy at a relatively slower rate. The schematic of FIG. 10 is a downward view as seen in the view of FIG. 9, showing only the components below the rigid panel 211 that are used for kinetic energy transfer from the train to the kinetic energy storing flywheel and the electrical generator being driven by the flywheel. In FIG. 10, a cross-sectional view of the rack 247 is shown as engaged with the gear (pinion) 251, which is fixedly attached to the shaft 252, which is free to rotate inside the bearing 253. The bearing 253 is fixedly attached to the structure 212 of the kinetic energy to electrical energy conversion unit 250. The shaft 252 is then connected to the shaft 254, which is free to rotate inside the bearings 256 and 257, via a one-way clutch 255. The flywheel 258 is then fixedly mounted on the shaft 254. The shaft 254 is then connected to the shaft of the electrical generator 259 (such as by a flexible coupling—not shown). The electrical generator is in turn fixedly attached to the structure 212 of the kinetic energy to electrical energy conversion unit 250.

Then as the wedged-shaped member 203, FIG. 5, engages a kinetic energy to electrical energy conversion unit 250 and displaces the rigid panel 211 downward as seen in the view of the schematic of FIG. 9, the resulting downward motion of the rack 247 causes the gear 251 to rotate, thereby rotating the shaft 252. The one-way clutch 255 is then used to transmit the rotation of the shaft 252 to the shaft 254, thereby to the flywheel 258, thereby transferring a portion of the kinetic energy of the train to the flywheel 258. Then as the kinetic energy to electrical energy conversion unit 250 disengages the wedged-shaped member 203, the spring members 209 return the rigid panel 211 to its pre-engagement position, during which time the one-way clutch 255 allows free rotation of the shaft 252 relative to the shaft 254. The flywheel 258 will then rotate the shaft of the electrical generator 259 via the shaft 254, thereby causing the mechanical kinetic energy stored in the flywheel 258 to be converted to electrical energy by the electrical generator 259.

It will be appreciated by those skilled in the art that the flywheel equipped kinetic energy to electrical energy conversion unit of FIG. 10 may be constructed in a variety of other configurations with and without intermediate ("winding") spring elements to optimize the design for each intended application, for example, when the train is traveling at a high speeds and the TDS is intended to slow it down to a safe speed or where the TDS is used to bring the train to a smooth stop at a subway station.

It will also be appreciated by those skilled in the art that other means of storing potential energy may also be used in the kinetic energy absorbing units 205, FIGS. 4 and 5 and consequent conversion to electrical energy. For example, the spring elements 209 may be replaced with springs acting as pumps to compress air and via a one-way valve to store it in a compressed air reservoir. The compressed air can then be used to run a turbine that would run an electrical generator to convert the stored mechanical potential energy of the stored compressed air to electrical energy.

It will also be appreciated by those skilled in the art that the potential energy to be absorbed by the spring elements 209 of the kinetic energy absorbing units 205, FIGS. 4 and 5 may instead be transferred to another mechanical potential energy storage unit (not shown), such as a power spring, via a ratchet or a one-way clutch, similar to the winding mechanism of a clock. Then after several passing of the wedged-shaped member 203 over the kinetic energy absorbing unit and when a prescribed stored mechanical potential energy threshold is reached, then the stored mechanical potential energy is used to generate electrical energy, for example by transferring it to the flywheel 258 of the flywheel equipped kinetic energy to electrical energy conversion unit of FIG. 10.

It will also appreciated that the disclosed TDS embodiments may be used together with the various embodiments disclosed in U.S. Pat. No. 7,717,043.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A device for decelerating a vehicle traveling on one or more rails, the device comprising:
   first and second energy absorbing units disposed along a direction of travel of the vehicle, the first and second energy absorbing units each having a first surface for engagement with a second surface disposed on the vehicle such that the first and second energy absorbing units are compressed when the second surface travels past and engages with the first surface of the first and second energy absorbing units;
   wherein the first and second energy absorbing units, when compressed, are configured to convert a kinetic energy of the vehicle to one or more of potential, heat and electrical energy;
   the first and second energy absorbing units are opposed to each other in a lateral direction relative to a direction of travel of the vehicle such that forces acting on the second surface from the first and second energy absorbing units cancel in the lateral direction; and
   the second surface is a wedge having two inclined surfaces extending laterally outward at an angle.

2. The device of claim 1, wherein the first and second energy absorbing units comprise a first pair of energy absorbing units, the device further comprising at least a second pair of energy absorbing units disposed in the direction of travel relative to the first pair of energy absorbing units.

3. The device of claim 1, wherein the first surface comprises a wheel rotatable about an axis such that the wheel rolls over the second surface.

4. The device of claim 1, wherein the two inclined surfaces are curved.

5. The device of claim 1, wherein the first and second energy absorbing units comprise one or more of a spring, a damper and an electrical generator.

6. The device of claim 1, wherein the first and second energy absorbing units are fixed to the one or more rails.

7. The device of claim 1, wherein the second surface is selectively movable, relative to the vehicle, into and out of engagement with the first surface.

8. The device of claim 1, further comprising an energy storage device for storing the converted kinetic energy.

9. The device of claim 8, wherein the energy storage device is a flywheel.

10. A device for decelerating a vehicle traveling on one or more rails, the device comprising:
    first and second energy absorbing units disposed along a direction of travel of the vehicle, the first and second energy absorbing units each having a first surface for engagement with a second surface disposed on the vehicle such that the first and second energy absorbing units are compressed when the second surface travels past and engages with the first surface of the first and second energy absorbing units;
    wherein the first and second energy absorbing units, when compressed, are configured to convert a kinetic energy of the vehicle to one or more of potential, heat and electrical energy;
    the first and second energy absorbing units are opposed to each other in a lateral direction relative to a direction of travel of the vehicle such that forces acting on the second surface from the first and second energy absorbing units cancel in the lateral direction; and
    the first surface comprises a wheel rotatable about an axis such that the wheel rolls over the second surface.

11. The device of claim 10, wherein the first and second energy absorbing units comprise a first pair of energy absorbing units, the device further comprising at least a second pair of energy absorbing units disposed in the direction of travel relative to the first pair of energy absorbing units.

12. The device of claim 10, wherein the second surface is a wedge having two inclined surfaces extending laterally outward at an angle.

13. The device of claim 12, wherein the two inclined surfaces are curved.

14. The device of claim 10, wherein the first and second energy absorbing units comprise one or more of a spring, a damper and an electrical generator.

15. The device of claim 10, wherein the first and second energy absorbing units are fixed to the one or more rails.

16. The device of claim 10, wherein the second surface is selectively movable, relative to the vehicle, into and out of engagement with the first surface.

17. The device of claim 10, further comprising an energy storage device for storing the converted kinetic energy.

18. The device of claim 17, wherein the energy storage device is a flywheel.

* * * * *